United States Patent [19]
Davis

[11] 3,905,573
[45] Sept. 16, 1975

[54] ADJUSTABLE READING AID

[76] Inventor: James M. Davis, 6723 Fifth Ave., Los Angeles, Calif. 90043

[22] Filed: Nov. 9, 1973

[21] Appl. No.: 414,374

[52] U.S. Cl. .................. 248/445; 248/454; 248/284
[51] Int. Cl.² ......................................... A47B 23/00
[58] Field of Search ........... 248/103, 104, 278, 284, 248/445, 451, 477, 485, 486, 242

[56] References Cited
UNITED STATES PATENTS

| | | | |
|---|---|---|---|
| 289,652 | 12/1883 | Haynes | 248/451 |
| 1,027,910 | 5/1912 | Schulz | 248/477 |
| 1,129,960 | 3/1951 | Conning et al. | 248/477 |
| 1,554,137 | 9/1925 | Slipkin | 248/242 X |
| 2,015,280 | 9/1935 | Morishita | 248/451 |
| 2,359,895 | 10/1944 | Burton | 248/445 |
| 3,747,889 | 7/1973 | Gerald | 248/451 |

FOREIGN PATENTS OR APPLICATIONS

| | | | |
|---|---|---|---|
| 861,591 | 1/1953 | Germany | 248/445 |
| 729,468 | 4/1932 | France | 248/445 |
| 498,835 | 5/1930 | Germany | 248/445 |
| 66,033 | 5/1913 | Switzerland | 248/445 |

*Primary Examiner*—William H. Schultz
*Attorney, Agent, or Firm*—William P. Green

[57] ABSTRACT

A device including a unit adapted to hold a book in open condition for reading, and an elongated structure for adjustably supporting the book holding unit and adapted to be connected at a first end to a headboard of a bed or the like, and to carry the book holding unit at an opposite end of the elongated structure, with the structure being adjustable to various conditions between those ends in a manner changing the position and orientation of the book.

2 Claims, 10 Drawing Figures

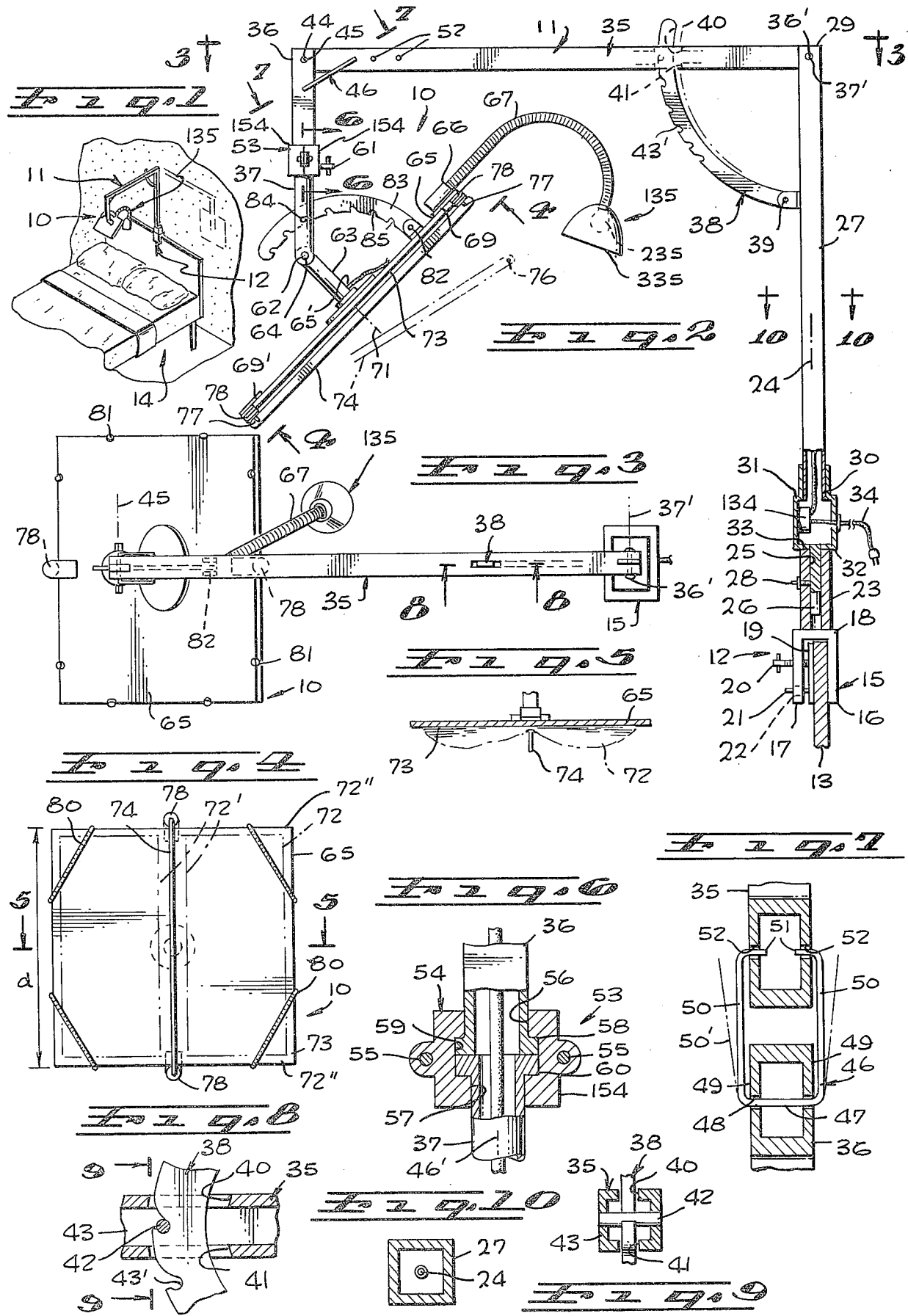

ial. The invention has been shown in Disclosure Document No. 018284 filed Apr. 9, 1973.

ADJUSTABLE READING AID

BACKGROUND OF THE INVENTION

This invention relates to improved reading aid devices for holding a book or other similar reading material. The invention has been shown in Disclosure Document No. 018284 filed Apr. 9, 1973.

The manual holding of a book while reading can become very inconvenient and tiring over an extended period of time, and can result in reduced comprehension of the subject matter, reduced enjoyment of the reading process, and inability to continue reading for as long a period as would otherwise be desired, and any of various other adverse effects. Further, the different positions of the body in which a person can comfortably read while holding a book manually are necessarily very limited. In particular, it is very difficult to read a book while lying on one's back, since the book must then be held by the hands in an upper position which is extremely tiring and unnatural.

SUMMARY OF THE INVENTION

A device constructed in accordance with the present invention reduces reading fatigue and increases comprehension and enjoyment by supporting reading material in convenient position without the necessity for manual holding of the material by the reader himself, and in a manner enabling easy adjustment of the holder and reading material to any of numerous different positions and orientations to satisfy the desires or requirements of different individuals and different reading circumstances. The device is in certain respects especially useful for holding a book or the like at an elevated position above a bed, in a manner enabling a person to read the book while lying on the bed. Certain particular features relate to a manner in which the device may be mounted for swinging movement between an active reading position and an out of the way retracted position. Further, the device may be folded to a reduced dimension condition for storage or handling.

Structurally, a device embodying the invention includes an elongated structure having a mounting portion at one end by which the device is supported, and having a unit for holding a book or the like secured to its opposite end, with the elongated structure being designed for adjustment to any of various different conditions between its two ends in a manner enabling adjustment of the position and orientation of the book holding unit and a carried book to any of numerous different reading positions. The mounting portion of the elongated unit may include a clamp device adapted to be tightened against and grip a support structure, such as the headboard of a bed. Desirably, the elongated structure includes a number of rigid links, pivotally interconnected in an articulated end to end series, and preferably including an upwardly projecting first member, an outwardly projecting generally horizontal second member, and a downwardly projecting third member which carries the book holding unit proper. The first member may be mounted by a swivel connection for swinging movement with the remainder of the structure about an essentially vertical axis and between active and retracted positions. A second swivel connection may mount the book holding unit for turning movement about a second generally vertical axis, with an associated pivotal connection mounting the unit for a second type of swinging movement, about a generally horizontal axis, in a manner maximizing the different orientational positions to which the unit and book can be moved.

The book holding unit proper may include a backing structure against which a book can be positioned in open condition, together with means for retaining the book to the backing structure in that position. The latter means may include an element adapted to extend between successive pages of the book at the location of the binding, and having connection to the backing structure at opposite ends of the element. Also, the corners of the pages of the book may be retained by elements connected to the backing structure and extending across those corners. To illuminate the book, the backing structure may have an appropriate lamp, desirably adjustably positionable relative to that backing structure.

BRIEF DESCRIPTION OF THE DRAWING

The above and other features and objects of the invention will be better understood from the following detailed description of the typical embodiment illustrated in the accompanying drawing in which:

FIG. 1 is a perspective representation of a book holding device constructed in accordance with the invention, and shown mounted on a bed;

FIG. 2 is an enlarged side view of the FIG. 1 book holding device;

FIG. 3 is a plan view of the device, taken on line 3—3 of FIG. 2;

FIG. 4 is a front elevational view of the book holding unit proper, taken on line 4—4 of FIG. 2;

FIG. 5 is a reduced scale transverse section taken on line 5—5 of FIG. 4;

FIG. 6 is an enlarged fragmentary vertical section taken on line 6—6 of FIG. 2;

FIG. 7 is an enlarged fragmentary section taken on line 7—7 of FIG. 2;

FIG. 8 is an enlarged fragmentary vertical section taken on line 8—8 of FIG. 3; and FIGS. 9 and 10 are transverse sections taken on line 9—9 of FIG. 8, and line 10-10 of FIG. 2, respectively.

FIG. 1 shows in perspective a preferred form of book holding device embodying the invention, and including a book carrying unit proper designated by the number 10 supported adjustably by an elongated structure 11 having a mounting portion 12 detachably connectible to the headboard 13 of a bed 14. The unit 10 and a carried book are adapted to swing between the full line active position of FIG. 1 in which a person lying on his back on the bed can read the book, and the broken line retracted or inactive position of the device in which unit 10 is disposed essentially in the plane of headboard 13.

With reference now to FIG. 2, the mounting portion 12 of the elongated adjustable supporting structure 11 may take the form of a downwardly facing or downwardly opening clamp including an inverted U-shaped member 15 having two parallel planar vertical arms 16 and 17 connected by an upper cross piece 18 and receivable at opposite sides of the upper edge portion of vertical headboard 13. The portion 16 of member 15 serves as a stationary jaw of the clamp, coacting with a parallel vertical planar movable jaw 19 which is adjustable toward and away from jaw 16 by a pair of adjusting screws 20 threadedly connected into portion 17 of member 15. A guide pin 21 may project from jaw 19 and through a guide opening 22 in arm 17 of part 15, to locate the movable jaw within member 15 while permitting leftward and rightward movement of jaw 19 relative to jaw 16.

At its upper side, the clamp 12 rigidly carries an upwardly projecting tubular part 23, centered about a vertical axis 24 to contain an upwardly opening vertical cylindrical recess 25 into which a correspondingly dimensioned vertical externally cylindrical pin 26 projects downwardly to mount an upper rigid member 27 to clamp 12 for relative swiveling movement about axis 24 between the full line and broken line positions of FIG 1. A lock screw 28 may be threadedly connected into the side wall of tube 23, and be tightenable against pin 26 to lock it in any desired adjusted position about axis 24.

The upwardly projecting member 27 may be hollow and tubular, but square in cross-section as seen in FIG. 10. This cross-section may continue from the upper extremity 29 of part 27 to a lower extremity thereof at 30, with the lower portion of part 27 being appropriately rigidly connected to a hollow part 31 having a horizontal undersurface 32 which rests on and is supported by a horizontal upper end surface 33 of tube 23, to support part 31 and the remainder of the book holding structure from tube 23. The previously discussed pin 26 may be rigidly connected to part 31, and projects downwardly therefrom into tube 23 to form the swivel connection previously discussed, while at the same time allowing upward detachment of part 31 and part 26 and the connected upper structure from tube 23 when desired. An electric power cord 34 may extend into part 31 as seen in FIG. 2, and then extend into part 31 as seen in FIG. 2, and then extend upwardly into and through member 27 and other connected parts to energize a lamp assembly 135. If desired, part 31 may contain a ballast 134 for the lamp, connected into its circuit, or alternatively part 31 may contain batteries for energizing the lamp without external connection to a power source.

In addition to clamp 12, and part 27 and the detachable swivel connection therebetween, the elongated structure designated generally at 11 includes also a rigid upper member 35, a downwardly projecting member 36, and a member 37, with the book holding unit 10 being connected to the lower end of the latter. The member 35 is of the same square cross-section tubular construction as discussed in connection with member 27 (See FIG. 9). The two members 27 and 35 are pivotally connected by a pin 36' for swinging movement of member 35 relative to member 27 about an axis 37' which is horizontal and intersects vertical axis 24 perpendicularly. Member 35 may be supported in any of several different relative positions by an arcuate brace element 38, which is pivoted to member 27 at 39, and which extends through apertures 40 and 41 in the upper and lower walls of square tube 35. A pin 42 is connected to the opposite side walls 43 of member 35 to extend across the passage formed by openings 40 and 41, and be selectively receivable within any of several arcuately spaced notches 43' formed on arcuate brace member 38. These notches are shaped as shown in FIG. 2, so that when pin 42 is received within the lower upwardly concave portion of any of the notches, member 35 is effectively supported against downward swinging movement relative to member 27. The brace element 38 may be swung slightly inwardly toward axis 37' to a position of disengagement from pin 42 (broken line position of FIG. 2), to allow adjustment of member 35 and the pin to the different notches 43. In one of the positions of member 35, that member extends directly horizontally and directly perpendicular to vertical member 27, as seen in FIG. 2.

The short downwardly projecting third member 36 is of the same square cross-section as members 27 and 35, and is pivotally connected at 44 to the outer end of member 35 for swinging movement about a horizontal axis 45 parallel to axis 37'. As seen in FIG. 7, member 36 may be retained in different relatively adjusted positions by means of a spring wire brace element 46 of essentially U-shaped configuration, having a cross-piece 47 extending through and retained by aligned apertures 48 in the opposite side walls 49 of member 36, and having two spaced parallel arms 50 with inturned ends 51 selectively receivable within any of several spaced pairs of apertures 52 formed in the opposite side walls 43 of member 35. When ends 51 of arms 50 are received in the set of apertures in which they are located in FIG. 2, the member 36 extends directly vertically and parallel to member 27, and perpendicular to the outwardly projecting member 35. To adjust the angularity of member 36 with respect to member 35, the two turned ends 51 of arms 50 of spring member 46 are manually sprung outwardly to positions represented by the broken lines 50' of FIG. 7, to withdraw these portions 51 from apertures 52 and allow their insertion within a second pair of the apertures, to retain member 36 in a changed pivotally adjusted position.

The member 37 of FIG. 2 may be of straight cylindrical tubular configuration, rather than the square section discussed in connection with the other members 27, 35 and 36, but extends along the same axis 46' as member 36, and is mounted by a swivel connection 53 for rotary adjusting movement about axis 46' relative to member 36. For this purpose, the swivel connection may include a sleeve structure 54 typically formed of two complementary semicircular sections 154 secured together at diametrically opposite locations by screws or other fasteners 55 and forming together a vertical passage having an upper square section portion 56 receiving the lower end of member 36, in non-rotatable relation, and lower circular cross-section portion 57 receiving the upper end of externally cylindrical member 37. A lower flange 58 on member 36 is received within an enlarged portion 59 of the passage in structure 38, and an upper circular flange 60 on member 37 is similarly received within this enlarged portion 59 of the passage and is rotatable therein. Thus, the member 37 and connected parts can be rotated relative to structure 53 and member 36, about axis 46', to allow corresponding rotary adjustment of book holding unit 10. Member 37 can be locked in any desired set position by a thumbscrew 61, which is threadedly connected into one of the parts 154 and tightenable against the outer surface of tube 37 to retain it against rotation.

At its lower end, member 37 may be pivotally connected at 62 to a short tube 63, enabling the latter to swing relative to part 37 about a horizontal axis 64 which in the FIG. 2 setting of the apparatus is parallel to axes 45 and 37'. At its lower end, tube 63 carries a main rectangular backing plate 65 of the book holding unit 10. The electric cord 34 after extending through tubular parts 27, 35, 36, 37 and 63, may extend out of the lower end of tube 63 at 65 for extension into an inner end 66 of a flexible metal tube 67 carrying the lamp assembly 135, which may include a bulb 235 removably connected into a socket within a reflector 335. The end 66 of flexible tube 67 is rigidly connected to rectangular backing plate 65 by an appropriate mounting bracket 69, with the tube 67 by its flexure permitting adjustment of the lamp and reflector to any desired position for illuminating a book carried by holder 10.

The backing structure or plate 65 may be essentially planar, as shown, and disposed perpendicular to the axis 71 of its short mounting tube 63. A book to be read, represented at 72 in FIG. 5, is positionable against the forward planar face 73 of backing plate 65, in open condition, with the binding of the book extending along the region designated at 72' in FIG. 4. The book is held against the backing plate by a retaining element 74, which may be an elongated rigid part formed of metal or the like and of a length somewhat greater than the dimension d of backing plate 65 as seen in FIG. 4. At its upper and lower ends, element 74 contains apertures 76, within which the curved hook shaped extremities 77 of a pair of short coil springs 78 are detachably connectible. The opposite ends of coil springs 78 are secured to the backing structure beyond its upper and lower edges, as by connection of one of these springs to the previously mentioned mounting element 69, and by connection of the other spring to a similar mounting element 69'. Element 74 is relatively thin and adapted to be received between successive pages of a book at the location of the binding, and is yieldingly urged inwardly toward the backing plate to clamp the binding of the book in place as shown in FIG. 5. To remove the book, one end of retaining element 74 may be detached from its corresponding spring 78 as represented in broken lines in FIG. 2.

At the four corners of the backing plate 65, this plate carries four elongated, elastic, longitudinally stretchable retaining straps or members 80, which extend diagonally across the corners of the backing plate, and therefore across the corners 72'' of the book pages, in a manner retaining those corners of the pages against the backing plate and thereby coacting with member 74 in holding the book in an open condition. The members 80 may be elongated coil springs, or elastically stretchable elements of rubber or the like, and be connected in any suitable manner at their opposite ends 81 to the backing plate.

For retaining the backing plate in any of different adjusted positions about axis 64, there may be pivotally connected to the rear side of the backing plate at 82 (FIG. 2) an arcuate brace element 83 similar to the previously discussed element 38 and extending through apertures in tube 37 and coacting with a pin 84 carried by that tube for reception selectively in any of different notches 85 in member 83 to lock unit 10 in different set positions.

To now describe the manner of use of the illustrated device, assume that a user has already attached clamp 12 to the upper edge portion of headboard 13 as seen in FIGS. 1 and 2. With the device thus mounted, the user may swing the entire unit 10 and connected parts about axis 24 from the broken line position of FIG. 1 to the full line position in which holder 10 is located above the user's eyes as he lies on the bed. A book 72 is attached to holder 10 in open position by reception of the binding portion of the book beneath the retaining element 74, and by inserting the four corners of the pages beneath retaining straps or springs 80. The book and its holder 10 can be raised or lowered by swinging member 35 about axis 37', to any position in which member 35 may be retained by reception of pin 42 within one of the notches 43'. Similarly, the connections at 44 and 62 can be adjusted, as can the swivel connection 53, to orient the book in virtually any desired position for optimum viewing by the particular reader. After two pages have been read, the reader moves one of the pages from the right side of the holder as viewed in FIG. 4 to the left side of the holder, inserts the corners of that page beneath the two left hand retaining elements 80, and then reads the next two pages of the book. Lamp 35 can be adjusted at any time for optimum illumination of the book. The illustrated holding mechanism thus avoids the necessity for manually holding the book, and allows a person to read for an extended period of time without tiring or the resultant loss of comprehension or loss of enjoyment. If it is desired at any time to completely remove the device from the bed, this may be done easily by merely loosening set screw 28 and then lifting pin 26 and the connected part 31 and all of the upper elements 27, 35, 36, 37, and 65 upwardly from clamp 12. The various pivotal connections may be actuated to fold the apparatus to a reduced dimension condition for storing or handling until the device is to be used again.

While a certain specific embodiment of the present invention has been disclosed as typical, the invention is of course not limited to this particular form, but rather is applicable broadly to all such variations as fall within the scope of the appended claims.

I claim:

1. A reading aid comprising a unit for detachably holding reading material; and an elongated structure supporting said unit and having a mounting portion at a first end thereof; said elongated structure being connected at a second end thereof to said unit, and being adjustable between said ends to different conditions supporting said unit and reading material carried thereby in any of various different reading positions relative to said mounting portion of the elongated structure; said mounting portion of said elongated structure including a downwardly facing clamp adapted to be received over and be clamped to the upper edge of a bed headboard or the like; said elongated structure including a first rigid member projecting upwardly above said clamp, a second rigid member connected pivotally to an upper portion of said first rigid member and projecting outwardly therefrom to a location offset horizontally from the clamp, a third rigid member pivotally connected to an outer end of said second rigid member and projecting downwardly therefrom and adjusting carrying said unit, a swivel connection attaching a lower portion of said first rigid member to said clamp for pivotal movement about a generally vertical axis to swing said members and said unit and carried reading material between an active reading position and an inactive retracted position, a fourth member projecting downwardly from said third member, a second swivel connection attaching said fourth member to said third member to turn relative thereto about a generally vertical axis, and a pivotal connection attaching said unit to said fourth member for pivotal adjusting movement about a generally horizontal axis; said unit including a backing structure against which a book is receivable in open condition, an elongated retaining element adapted to extend between successive pages of the book at a location opposite the binding to retain the book against said backing structure, two springs securing opposite ends of said retaining element to the backing structure beyond the binding of the book, and elastic corner retainers carried by said backing structure at locations to extend across different corners of the pages of the book and releasably retain them in open condition.

2. A reading aid as recited in claim 1, including an arcuate brace element and a coacting pin receivable selectively within any of different notches formed in said brace element to releasably retain said second member in any of different pivotally adjusted positions relative to said first member, an arcuate notched brace member and coacting pin for releasably retaining said unit in any of different pivotally adjusted positions relative to said fourth member, and a generally U-shaped brace wire having ends receivable selectively within different coacting apertures to releasably retain said third member in any of different pivotally adjusted positions relative to said second member.

* * * * *